US007140042B2

(12) United States Patent
Verma

(10) Patent No.: US 7,140,042 B2
(45) Date of Patent: Nov. 21, 2006

(54) SYSTEM AND METHOD FOR PREVENTING SOFTWARE PIRACY

(75) Inventor: Ravi Verma, Dallas, TX (US)

(73) Assignee: McAfee, Inc., Santa Clara, CA (US)

( * ) Notice: Subject to any disclaimer, the term of this patent is extended or adjusted under 35 U.S.C. 154(b) by 822 days.

(21) Appl. No.: 10/047,250

(22) Filed: Jan. 14, 2002

(65) Prior Publication Data

US 2003/0135756 A1 Jul. 17, 2003

(51) Int. Cl.
*H04N 7/16* (2006.01)
*H04L 9/32* (2006.01)

(52) U.S. Cl. .......................... 726/26; 726/31; 726/32; 726/33; 705/59

(58) Field of Classification Search ................ 713/201; 726/31, 32, 33, 26; 380/231; 705/59
See application file for complete search history.

(56) References Cited

U.S. PATENT DOCUMENTS

| | | | | |
|---|---|---|---|---|
| 5,032,979 A * | 7/1991 | Hecht et al. | .................. | 726/25 |
| 5,754,763 A * | 5/1998 | Bereiter | ...................... | 713/201 |
| 5,758,069 A * | 5/1998 | Olsen | ......................... | 713/201 |
| 6,367,034 B1 * | 4/2002 | Novik et al. | ................... | 714/39 |
| 6,453,305 B1 * | 9/2002 | Glassman et al. | ............ | 705/59 |
| 6,502,124 B1 * | 12/2002 | Shimakawa et al. | ........ | 709/203 |
| 6,574,612 B1 * | 6/2003 | Baratti et al. | ................. | 705/59 |
| 2002/0077986 A1 * | 6/2002 | Kobata et al. | ................ | 705/52 |
| 2002/0147696 A1 * | 10/2002 | Acker et al. | ................... | 707/1 |
| 2003/0088516 A1 * | 5/2003 | Remer et al. | ................. | 705/59 |

OTHER PUBLICATIONS (Database, definition) Dictionary.com, [Online] [Oct. 3, 2005] retrieved from http://dictionary.reference.com/search?q=database.*
(Gateway, definition) Dictionary.com, [Online] [Oct. 3, 2005] http://dictionary.reference.com/search?q=gateway.*
(Namespace, definition) Microsoft® computer dictionary, Microsoft press, Redmond, WA, 2002, p. 356.*

* cited by examiner

*Primary Examiner*—Gilberto Barron
*Assistant Examiner*—Thomas Szymanski
(74) *Attorney, Agent, or Firm*—Zilka-Kotab, PC; Christopher J. Hamaty

(57) ABSTRACT

The invention is directed to a method and apparatus for preventing software piracy. A license enforcement server may be integrated with an operating system running on a network-critical machine. As such, other computational devices connected to the network may obtain permission to perform licensed activities. These computational devices may have an instruction set for communicating with the license enforcement server. Further, the license enforcement server may communicate with a licensing organization. The license enforcement server may utilize a namespace tree to organize licenses and uniquely identify licensed activities. In this manner, a universal license enforcement system may be achieved in which disabling of the license enforcement mechanisms would adversely effect a network.

27 Claims, 7 Drawing Sheets

SYSTEM AND METHOD FOR PREVENTING SOFTWARE PIRACY

TECHNICAL FIELD OF THE INVENTION

This invention relates in general to a system and method for preventing unauthorized use of software. In particular, the invention relates to a method of validating licensed activities through an interconnected network.

BACKGROUND OF THE INVENTION

Software developers build revenue streams by licensing software to end users. However, significant losses in revenue may occur when software is pirated. As such, unlicensed use represents a large revenue loss to software companies. However, there is no unified method of preventing piracy.

In one exemplary licensing scenario, software products are licensed to companies. The license may be for a multitude of instances of the software application which may expire on a given expiration date. For example, a company may license ten copies of an application that expire at the end of the year. In this example, the revenue model for the software licensor is circumvented when more than the licensed number of copies are used or the copies are used beyond the expiration date.

In one typical embodiment, a server delivers the applications to a computer connected to the network. As such, the server keeps track of the number of applications delivered or the number of instances of the application in service. However, this method may be circumvented by detaching the computer from the network once the application has been served. Alternately, the server may lose track of the number of applications delivered, especially in the event of network failures or other network events.

A further typical solution is to require a license server to be named upon installation. This method may suffer similar deficiencies as the method above. Further, customers may be reluctant to undergo the expense associated with installing and maintaining a license server.

In another situation, applications are often sold or licensed to individuals for use on a single machine. These machines may be periodically connected to a network. A problem exists when one copy is installed on multiple machines.

Other typical solutions require a software key in order to enable the application to run. However, if the software is copied onto a second computer, the same key may be used; thus circumventing the licensing process. Such piracy accounts for a significant revenue loss to the software developer.

Another typical solution is to require electronic registration. With this solution, a software company may determine if multiple copies of the same licensed application have been installed on various machines. The electronic registration method may also attempt to determine if other pirated software resides on the machine requesting the registration. However, this method is often circumvented by users not registering the software.

On the other hand, companies have seen an increased liability associated with having pirated software on company computers. Periodic software audits that find pirated software may lead to costly fines. As a defensive measure, companies may be tempted to purchase more than the required number of licenses to limit their liability. In some instances, they may purchase licenses for all of the computers owned in the facility. However, the software may or may not be used at all the computers simultaneously.

As such, deficiencies exist in delivering software licenses. Software keys may be copied. Software delivered through servers may be pirated through errors in the network or the server. In addition, many other typical licensing mechanisms may be circumvented through network failure or the sharing of licensing and licensed keys.

As such, many typical licensing mechanisms suffer from deficiencies in providing and preventing piracy of software and providing an economic means for licensing software by companies. Many other problems and disadvantages of the prior art will become apparent to one skilled in the art after comparing such prior art with the present invention described herein.

SUMMARY OF THE INVENTION

Aspects of the invention are found in a license enforcement server. The license enforcement server may act to communicate with computers and other devices connected to a network. The communication may include requests for permission to run an application or messages indicating permission to run applications.

The license enforcement server may be located on a network machine. Further, the license enforcement server may be associated with the operating system running on the network machine. In addition, the network machine may have a licensed usage database, a namespace tree and/or communications instructions associated with delivering licenses.

Aspects of the invention may also be found in a computational device connected to the network. The computational device may have software instructions for communicating with the license enforcement server. Further, the computational device may have application software. The application software may have instruction sets for communication with the license enforcement server. In addition, the software may have instructions enabling or disabling the software in response to messages from the license enforcement server.

Further aspects of the invention may be found in an interconnected network to which the network machine and the computational devices are attached. The network machine, having the licensed enforcement server associated with the operating system running on the network machine, may be a network-critical machine. In addition, computational devices may be connected to the interconnected network. The computational devices may have software instruction sets for communicating with the network-critical machine and the license enforcement server residing thereon.

Further aspects of the invention may also be found in a secondary license enforcement server. The secondary license enforcement server may act as a back up to the first license enforcement server. The secondary license enforcement server may reside on a second network-critical machine and/or a machine acting to back up the first network-critical machine. The second license enforcement server may be in communication with the first license enforcement server. Further, the second license enforcement server may maintain a back up license database, usage database and/or namespace tree.

The network-critical machines may be machines such as domain name servers and address servers, among others.

Further, these servers may use operating systems such as Microsoft Windows NT®; Microsoft Windows XP®; Microsoft Windows 2000®; Microsoft Windows 98®; MacOS 9.x®; MaxOS X®; Linux®; FreeBSD®, UNIX®, and others. The license enforcement server may run as a system critical thread associated with the operating system or, the license enforcement server may be part of the operating system, among others.

Further aspects of the invention may be found in a machine-readable storage medium. The machine-readable storage medium may contain instruction sets for communicating between the license enforcement server and the application software. Further, the machine-readable storage medium may contain the application software or instruction sets operable to communicate with the license enforcement server. Alternately, the machine-readable storage medium may contain instruction sets for installing an application software. In another example, the machine-readable storage medium may contain the instruction sets of an operating system incorporating the license enforcement server.

Aspects of the invention may also be found in a method for obtaining permission to perform a licensed activity. For example, a software application may be initiated on a computational device. The software application may query the license enforcement server to obtain permission to run the application. In another example, an installation program associated with the application may query the license enforcement server to obtain permission to install the application on the computational device. The method may include steps of poling the license enforcement server, selectively determining the permissibility of the licensed activity, and performing the licensed activity.

As such, a system for preventing software piracy is described. Other aspects, advantages, and novel features of the present invention will become apparent from the Detailed Description of the Invention when considered in conjunction with the accompanying drawings.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein.

Corresponding reference numerals indicate corresponding parts throughout the several views of the drawings.

DETAILED DESCRIPTION OF THE PREFERRED EMBODIMENT

Figure 1:
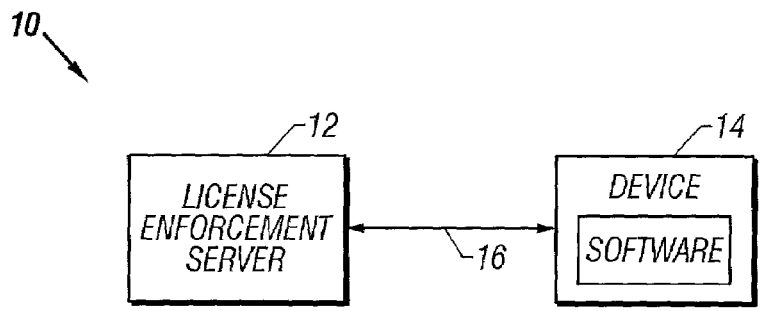
FIG. 1 is a schematic block diagram of the system according to the invention.

FIG. 1 is a schematic block diagram of the system according to the invention. The system 10 has a license enforcement server 12 connected with a computational device 14 through a communications means 16. The device 14 may have a licensed software component. This software may query the license enforcement server 12 through the communication means 16 to determine the status or permissibility of the license or licensed activity.

A licensed enforcement server 12 may take various forms. For example, the license enforcement server may take a hardware form such as a network device or server. Alternately, the license enforcement server may be a software component residing on a server or network device. However, the license enforcement server 12 may take these forms or various combinations of these forms and may be a combination of hardware and software.

A server and/or network device may take various forms. These forms may include an email server, a primary domain control server, a backup domain control server, a backbone server, a server providing DNS service or a server providing DHCP service, among others. Alternately, the license enforcement server 12 may be associated with switches and hubs. Moreover, the server and/or network device may or may not be a network-critical server and/or network device. A network-critical server and/or network device may be a server and/or network device, the failure of which would disable and/or diminish the functionality of the network. The functionality may, for example, be an essential functionality, the general operability of the network, or an addressing service, among others.

A licensed activity may take various forms. These forms may include the installation of software, running an application, accessing components of an application, accessing functionality of a software, and performing functions, among others.

In one potential embodiment, the license enforcement server 12 may be an integral part of the operating system associated with a server or network device. The operating system may take various forms. These forms may include Windows 98®, Windows NT®, Microsoft Windows 2000®, Microsoft Windows XP®, Linux®, BSD®, UNIX®, MacOS9.X®, MacOSX®, and others.

In one exemplary embodiment, the license enforcement server 12 may reside on a server acting as the primary domain control server, a domain name server, or an address server, among others. A computational device connected to a network 16 may interact with the license enforcement server to determine whether an activity is licensed. The licensed activity may, for example, be the installation of a software application or the continued running of a software application, among others.

Alternately, a computational device 14 may periodically be connected to a network 16. When connected, the computational device 14 may confirm permission to perform a licensed activity with a license enforcement server 12. The license enforcement server 12 may take the form, for example, of a domain server or license server connected to a global network. Further, the licensed activity may be the installation of software for which, a license is confirmed, obtained, purchased, and/or acquired, among others, through a network connection.

As such, various licensing models may be enabled. For example, a limited date model may be used in which a license is provided with a termination date. Alternately, this model could be used to license software for a period of time from the date of installation. For example, a license may be valid to a specific date or, alternately, three months from installation.

Another license model might be the limited launch model. In this model the license may be expressed in a number of application launches. For example, each time an instance of the application is launched, an available launch count is decremented. Once the available launch count reaches zero, the license would expire.

In another exemplary model, the license may be expressed in an amount of time. For example, the license may permit 200 hours of operation. This license may be accomplished by periodic querying of the license server. Alternately, the application may provide a beginning and ending time or some other time difference.

Another licensing approach would be a limited instance model. In this model, a finite number of instances of the application would be allowed at any one time. However, various combinations of these models may be envisaged. For example, an application may be licensed for a specific date or period with a finite number of installations. In another exemplary embodiment the license may be expressed in terms of a finite amount of application running time with a limited number of launches.

In this manner, software developers and software companies may prevent piracy using the license server system above. In addition, companies may benefit by more optimally allocating licensing costs over time. Further, these companies may benefit by limited exposure to fines and penalties associated with having unlicensed software.

Figure 2:
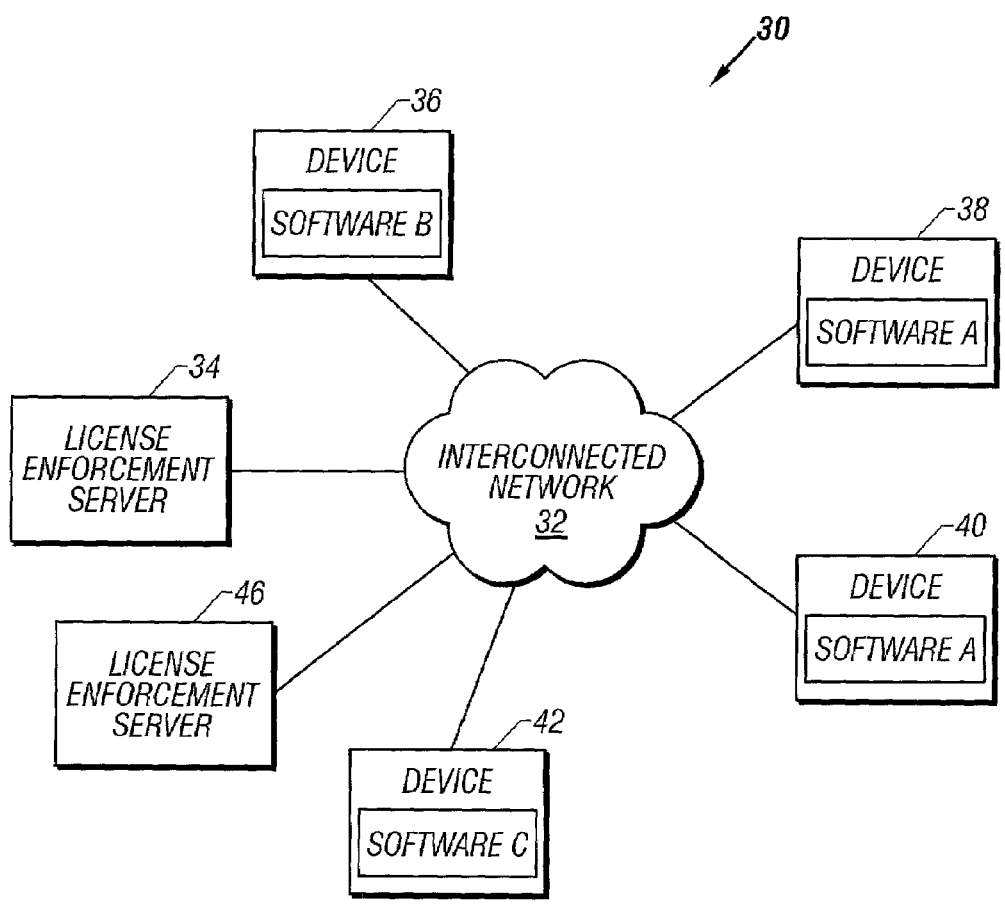
FIG. 2 is a schematic block diagram of an exemplary embodiment of the system as seen in FIG. 1.

FIG. 2 is a schematic block diagram of an exemplary embodiment of the system as seen in FIG. 1. The system 30 may have an interconnected network 32 to which at least one license enforcement server 34 may be connected. In addition, various computational devices 36, 38, 40 and 42 may be connected to the interconnected network 32. The devices 36, 38, 40 and 42 may have software components or applications that may communicate through the interconnected network 32 with the license enforcement server 34 to obtain permission to perform a licensed activity. Various applications may be of different vendors or the same vendor, among others. Further, the applications may have varying functionalities, as well as varying versions of the same application.

The computational devices may take various forms. These forms may include computers, desktop computers, laptop computers, portable computers, workstations, handheld devices, smart phones and network servers, among others.

In addition, the software may take varying forms. These forms may include applications, libraries, operating systems, wizards, and macros, among others. Further, the software may be compiled from code written in C++, Visual Basic, FORTRAN and others. Alternately, the software may be interpreted from code written in Java, PERL, and Visual Basic, among others.

The software and/or applications may obtain permission to perform a licensed activity from the license enforcement server 34. In one exemplary embodiment, the license enforcement server may reside on a server or network device. These devices may take various forms. These forms may include an email server, a primary domain control server, a backup domain control server, a backbone server, a server providing DNS service, or a server providing DHCP service, among others.

Further, the license enforcement server may reside on a network-critical server, device or machine. The license enforcement server 34 may form an integral part of the operating system. As such, tampering or disabling the license enforcement server 34 may disable, disrupt or cause the interconnected network 32 to fail. The interconnected network 32 may take varying forms. These forms may include global networks, wide area networks, local area networks, wireless networks, and rings, among others.

With further reference to FIG. 2, a backup license enforcement server 46 may be connected to the interconnected network 32. In one exemplary embodiment, the backup license enforcement server 46 may communicate with the primary license enforcement server 34 to maintain a backup license and usage database. Further, the license enforcement server 46 may maintain a backup data associated with licenses and licensing models. In the event, that the primary license enforcement server 34 is to fail, the backup license enforcement server 46 may assume the license enforcement role with little or no loss in network and/or license enforcement service. However, the license enforcement server 46 may also act to license a different set of licensed activities and/or various combinations of licenses.

In one exemplary embodiment, a software A residing on a device 38 may communicate with the license enforcement server 34 through the interconnected network. In doing so, the software A may acquire permission to run. In addition, the software A residing on a device 40 may communicate through the interconnected network 32 to the license enforcement server 34. Depending upon the model and the number of instances of software A running on devices connected to the interconnected network 32, software A may or may not be given permission to run.

Software B may be installed on a device 36. Software B may be developed by a differing organization or may be, for example, a different version of a similar application to that of software A. During installation, device 36 may communicate with the license enforcement server 34 through the interconnected network 32 and obtain permission to install software B.

In another exemplary embodiment, a software C may be running on a device 42. The software C may communicate with the license enforcement server 34 through the interconnected network 32 periodically to establish that a permissible run time has not expired.

In this manner, multiple applications from varying vendors may run using varying licensing models and all obtaining licenses from a single license enforcement server and/or a combination of license enforcement servers.

In another exemplary embodiment, the license enforcement server or servers may be connected to an external network or communications means. The communications means may take various forms. These forms may include a modem, wireless connection, cable modem, Ethernet, phoneline, T1, or T3, among others.

Figure 3:
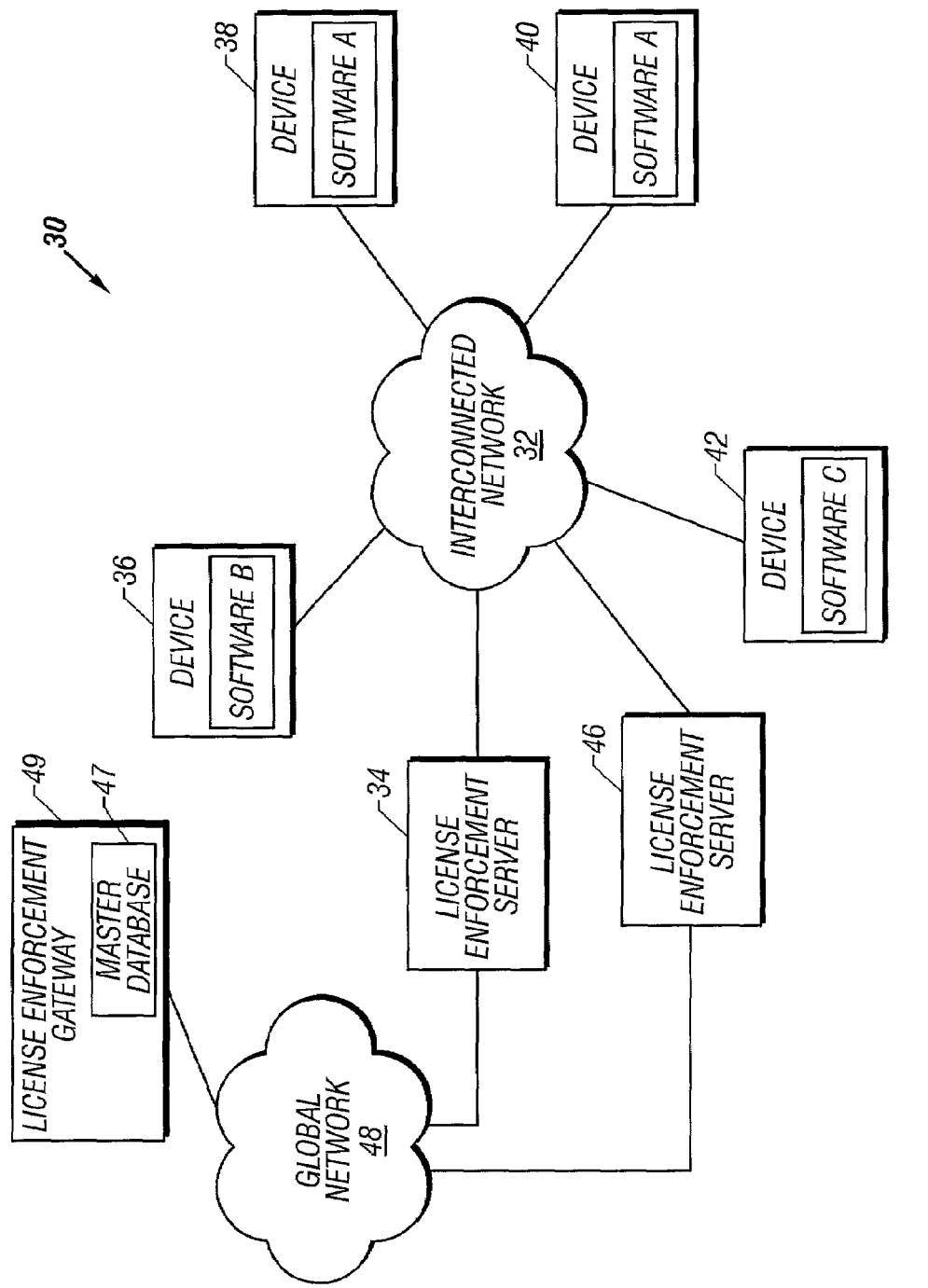
FIG. 3 is a schematic block diagram of an exemplary embodiment of the system as seen in FIG. 1.

FIG. 3 is a schematic block diagram of an exemplary embodiment of a network machine for use in the system as seen in FIG. 1. In this exemplary embodiment, the system 30, similar to that of FIG. 2, may operate such that devices may obtain permission to perform licensed activities from a license enforcement server 34 through an interconnected network 32. In one exemplary embodiment, the license enforcement server 34 and 46 may be connected to a global network 48 or another communications means. Through this communications means or global network 48, the license enforcement server 34 or 46 may obtain additional licenses for software. Alternately, a software provider may query the machine or install new licenses, among others.

Referring again to FIG. 3, in another exemplary embodiment, a licensing organization may communicate with the license enforcement server 34, or 46 through the global network 48 or other communications means. The license enforcement server 34, 46 may communicate with a license enforcement gateway 49. In this manner, the licensing organization may establish the universal licensing structure, such as, for example, a namespace tree.

With reference to FIG. 3, in another exemplary embodiment, a license enforcement gateway 49 is communicatively coupled to the global network 48 through a communications means. The communications means may take various forms. These forms may include a modem, wireless connection, cable modem, Ethernet, phoneline, T1, or T3, among others. In this exemplary embodiment a master database 47 is on or accessible through the license enforcement gateway 49.

Periodically, a license enforcement server, such as license enforcement server 34, can connect to the license enforcement gateway 49 to synchronize and validate its own licensing database and/or namespace tree according to this particular exemplary embodiment.

As such, a universal method for uniquely identifying licensed products may be established. Further, a universal method for license delivery and validation may be established. In addition, a method for detecting, discovering, alarming, warning, and preventing, among others, unlicensed activities may be envisaged.

The license enforcement server 34 may communicate with the license enforcement gateway 49 information relating to, among other things, for example, a particular license or list of licenses, communications regarding use, queries and/or requests for new licenses and/or addendums to existing licenses, alarms and/or warnings of misuses or piracy, alarms and/or warnings of tampering or disabling, and other information based upon activity of the devices and servers operating in the system 30, among others.

For the license or list of licenses, if a license is valid, then the license gateway 49 may return to the license enforcement server 34 a "Yes", for example, to allow installation and execution of an application or software on a client or device. If a license is not valid, then the license gateway 49 may return to the license enforcement server 34 a "No", for example, to prevent installation and execution of an application or software on a client or device. Thus, when a client or device attempts to install and/or execute an unlicensed application, such client or device can be stopped or notified. In this exemplary embodiment, no two clients on the Internet may use the same license if it is not permitted. However, the license enforcement server may periodically confirm a license or confirm the license in response to an event such as a date, number of launches, or number of logged hours, among others. Between confirmations, the license enforcement server may authorize licenses without accessing the license enforcement gateway 49.

By means of the global network 48 the license enforcement server 34, 46 may communicate with the license enforcement gateway 49 to update its own database based on the master database 47 within or accessible through the license enforcement gateway 49. Similarly, the license enforcement gateway 49 may be accessible to a stand-alone user.

Organizations may update the master database 47 to reflect purchases and sales activity such that databases on the license enforcement servers 34, 46 in the system 30 illustrated in FIG. 3 are kept current.

Alternately, multiple license enforcement gateways 49 may be connected to a global network. These license enforcement gateways 49 may have a listing of authorized licenses 47. In this manner, a universal method may be used to communicate with multiple vendors for obtaining licenses and/or addendums to existing licenses. However, the various vendors may maintain separate authorized licenses listings 47.

Figure 4:
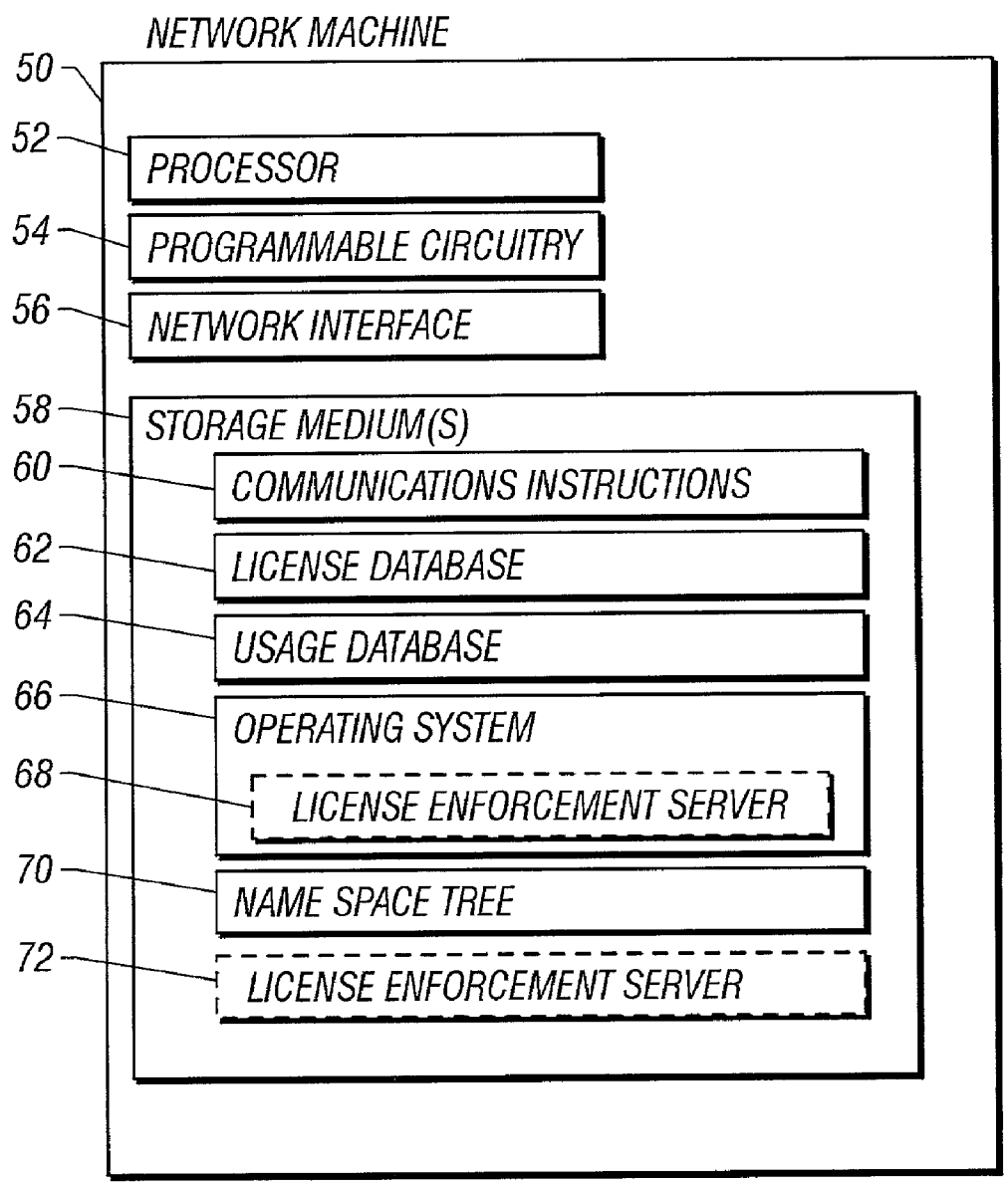
FIG. 4 is a schematic block diagram of an exemplary embodiment of a network machine for use in the system as seen in FIG. 1.

The license enforcement server may reside on a network machine. FIG. 4 is a block diagram of an exemplary embodiment of a network machine for use in the system as seen in FIG. 1. The network machine 50 may have a processor 52, a programmable circuitry 54, a network interface 56, and one or more storage mediums 58. The processor 52 and/or the programmable circuitry 54 may access the storage medium or mediums 58 to acquire instructions associated with the operating system 66. Further, the network machine 50 may combine these various components and various configurations. However, many other configurations can be envisaged.

Associated with the operating system may be the license enforcement server 68 or components thereof. Alternately, the license enforcement server 72 may be separate from the operating system.

The processor may take many various forms. These forms may include various microprocessors, chips, and processing apparatuses, among others. Further, the system may have more than one processor.

The programmable circuitry may take various forms. These forms may be adaptable or programmed through various means. These means may include keyboards, graphical user interfacing devices, handheld circuitries, across networks, and others.

The network interface 56 may take various forms. These forms may connect the network interface 56 to a local area network, wide area network, or global network, among others. Further, the network interface 56 may function to communicate with computational devices seeking permission to perform license activities, other network machines, network machines with back up license enforcement servers, software licensors, and software organizations, among others. Further, the network interface may use various protocols to communicate. These protocols may include TCP/IP, Ethernet protocols, licensing protocols and others.

Storage medium or mediums 58 may take varying forms. These forms may include RAM, ROM, flash memory, hard drives, floppy drives, removable drives, CDs, DVDs, memory stick, and memory cards, among others.

A storage medium or mediums 58 may hold communications instructions 60, a licensing database 62, usage database 64, an operating system 68, and a namespace tree 70, among others. Further, a license enforcement server 68 may be associated or integrated into the operating system 66. Alternately, a license enforcement server 72 may be stored separate from the operating system 66. However, various parts, components, subroutine, and libraries, among others may or may not, in various combinations, be associated with the operating system.

The communications instructions 60 may enable the network machine to communicate with various computational devices seeking licenses to perform licensed activities. A licensed database 62 may be a database of licenses purchased for various products and current usage accounts associated with those products. Alternatively, a usage database may store the information associated with current usage or information associated with various methods for licensing software. These databases may take varying forms. These forms may include text files, spreadsheets, Microsoft Jet databases, My SQL relational databases, and object databases, among others.

Further, the databases may be organized using a namespace tree 70. The namespace tree 70 may uniquely identify various organizations, products, and versions associated with software applications. In addition, the namespace tree may be maintained by a single organization and may be communicated to the network machine through a global network or other communications means.

In one exemplary embodiment, the network machine may be a machine critical to network performance. For example, the network-critical machine may take the form of an email server, a primary domain control server, a backup domain control server, a backbone server, a server providing DNS service, or a server providing DHCP service, among others.

In the case where the license enforcement server or components thereof 68 are integrally tied to the operating system 66. An attempt to disable the license enforcement server 68 may cripple or disable the network. In this manner, piracy may be prevented or discouraged.

Figure 5:
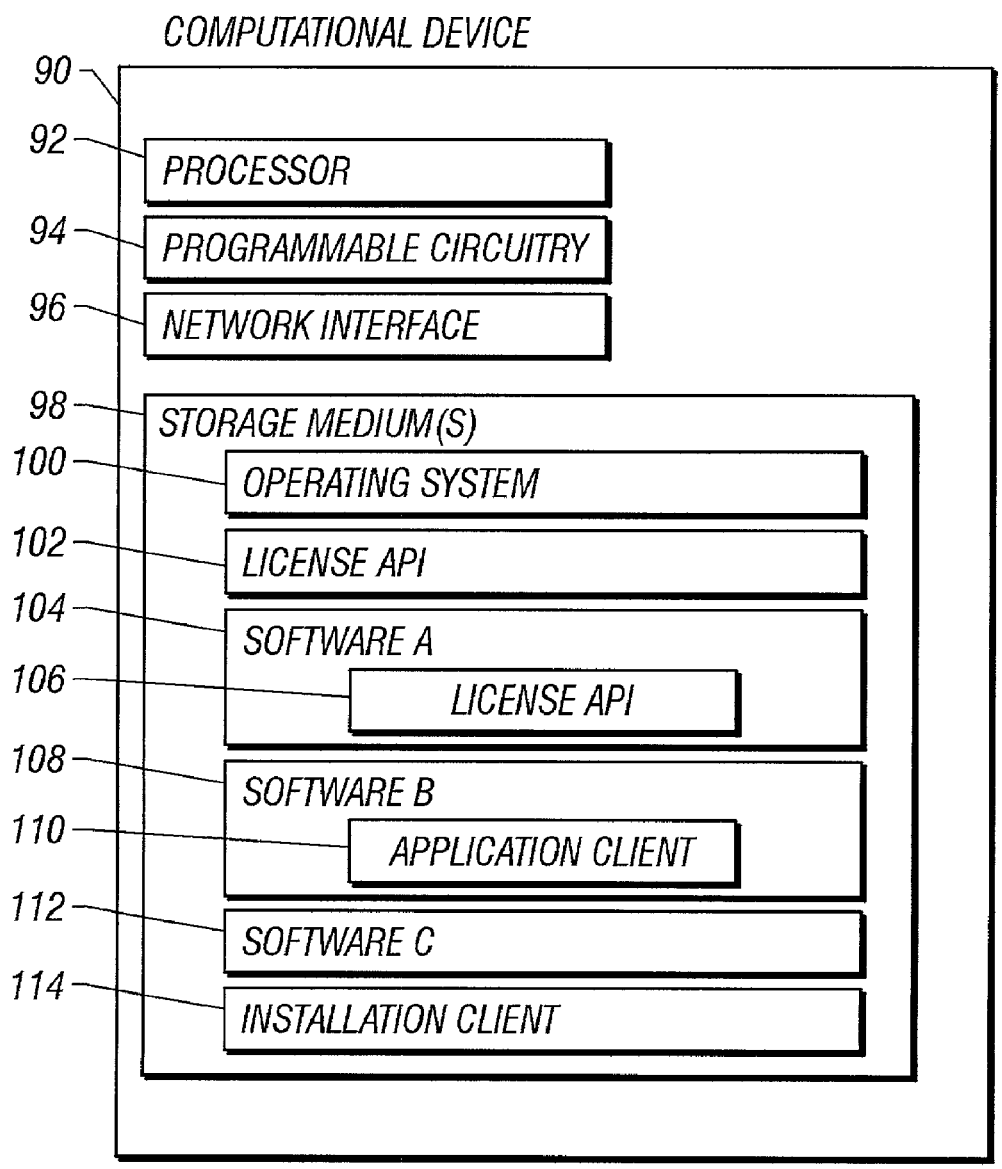
FIG. 5 is a block diagram of an exemplary embodiment of a computational device for use with the system as seen in FIG. 1.

FIG. 5 is a schematic block diagram of an exemplary embodiment and a computational device as seen in FIG. 1. The computational device 90 may have a processor 92, a programmable circuitry 94, a network interface 96, and one or more storage mediums 98. The storage medium or mediums 98 may have software instruction sets associated with an operating system 100, a license API 102, a software A 104, a software B 108, a software C 112 and/or an installation client 114. The computational device may have some, all or none of these components. Further, the computational device 90 may combine these various components and various configurations. However, many other configurations can be envisaged.

The processor 92 may take various forms. These forms may include various microprocessors, chips, chipsets, and other processing apparatuses.

The programmable circuitry 94 may take various forms. These forms may be adaptable or programmed through various means. These means may include keyboards, graphical user interfacing devices, handheld circuitries, across networks, and others.

The network interface 96 may take various forms. These forms may connect the network interface 56 to a local area network, wide area network, or global network, among others. Further, the network interface 56 may function to communicate with network machines with primary or backup license enforcement servers, and other network machines, among others. Further, the network interface may use various protocols to communicate. These protocols may include TCP/IP, Ethernet protocols, licensing protocols and others.

The storage medium or mediums 98 may take various forms. These forms may include RAM, ROM, flash memory, hard drives, floppy drives, removable drives, CDs, DVDs, memory stick, and memory bands, among others.

The storage medium or mediums 98 may have a license API 102 comprising instructions for communication with the license enforcement server. Further, the license API 102 may form an interface with the license enforcement server and various software. In one example, the license API 102 may take various forms such as dynamic linked libraries, components, and/or threads of the operating system, and executables, among others.

In another exemplary embodiment, the license API 106 may be incorporated into a software A 104. In this manner, a license API 106 may enable software A to communicate with the license enforcement server through the network interface 96. Alternately, an application client 110 may be incorporated in a software B 108. The application client 110 may interface with the license API 102 to communicate through the network interface 96 with the license enforcement server.

In another exemplary embodiment, an installation client 114 may communicate with the license enforcement server using the license API 102, or on its own. In either case, the installation client may communicate with the license enforcement server through the network interface 96. In this case, the installation client may seek permission to install software C 112.

In this manner, various licensing models may be used. Further, these licensing models may be employed on various software programs residing on the same computational device 90. However, some, all or none of these licensing models may be in use on the computational device 90. In addition, various combinations of licensing models may be used or incorporated into the various software products associated with the computational device 90.

Figure 6:
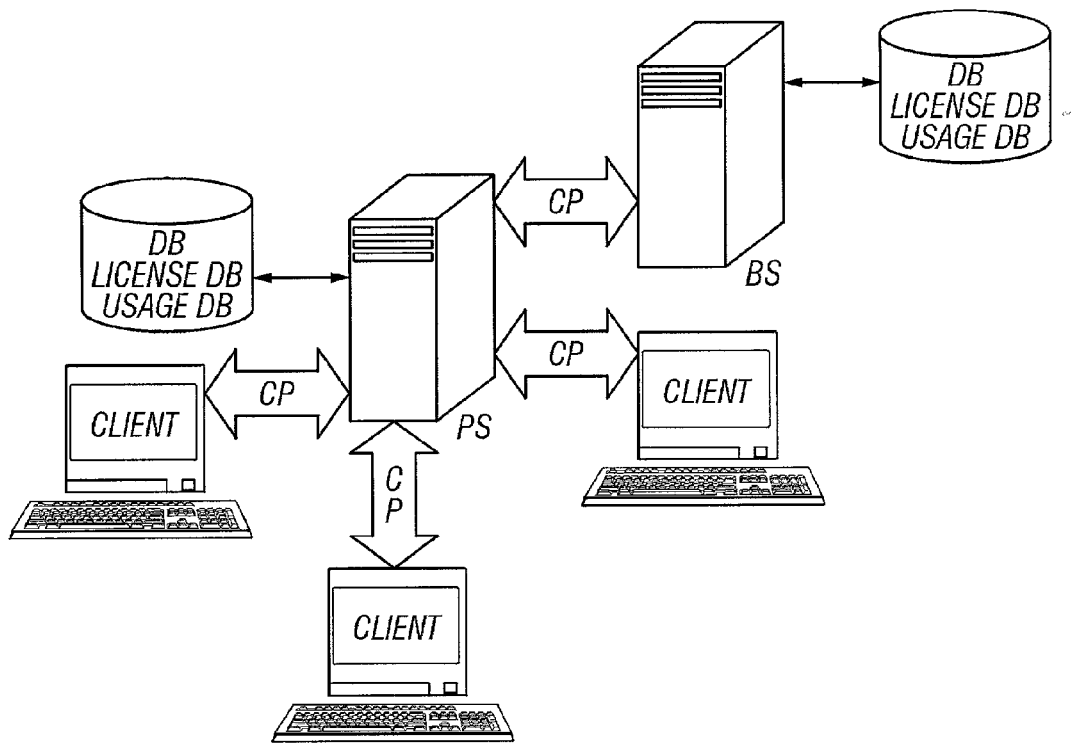
FIG. 6 is a schematic block diagram of an exemplary embodiment of the system as seen in FIG. 1.

In another exemplary embodiment, sets of client machines are connected through an interconnected network to a network-critical server. FIG. 6 is a schematic block diagram of another exemplary embodiment of the system as seen in FIG. 1. In FIG. 6, sets of clients communicate with the network-critical server using a communications protocol ("CP"). The protocol may be a standard protocol or one specific to a licensing enforcement server method. The network-critical server denoted the primary server ("PS") has the license enforcement server as an integrated part of the operating system. When prompted for permission to perform a licensed activity, the license enforcement server may communicate with the licensed database, the usage database or another database to ascertain the availability of a license.

A backup server ("BS") may communicate with the primary server through a similar communications protocol or a protocol specific to the license enforcement server method. Through this interaction, the backup server may create a backup license database, usage database, or other data associated with the license enforcement server. If the primary server were to fail, the backup server may take on the role of the primary server.

In one exemplary embodiment, the primary server may be a primary domain control server. The license enforcement server may be an integrated part of the operating system of the primary domain control server. A backup domain control server may similarly have a license enforcement server software incorporated into the operating system. The backup domain control server may communicate with the primary domain control server to acquire data, databases, licensed databases, usage databases, and other data associated with the license enforcement server. If the primary domain control server were to fail, the backup domain control server would activate and take over the role of the license enforcement server.

With this system, one or more client computational devices may interact with a network-critical server to obtain permission to perform a licensed activity. Further, piracy would be limited by the fact that disabling of the primary control server would either disable the network preventing permission to be delivered for performing the licensed activity or activate the backup server, maintaining the network and the license enforcement server mechanisms. In addition, various client computational devices may interact with the license enforcement servers. Further, various software produced by various vendors may interact simultaneously with the license enforcement servers.

One aspect of the invention may be found in the namespace tree. In order to organize various software products produced by various vendors and serve licenses using various licensing models, the namespace tree provides a means of organization.

Figure 7:
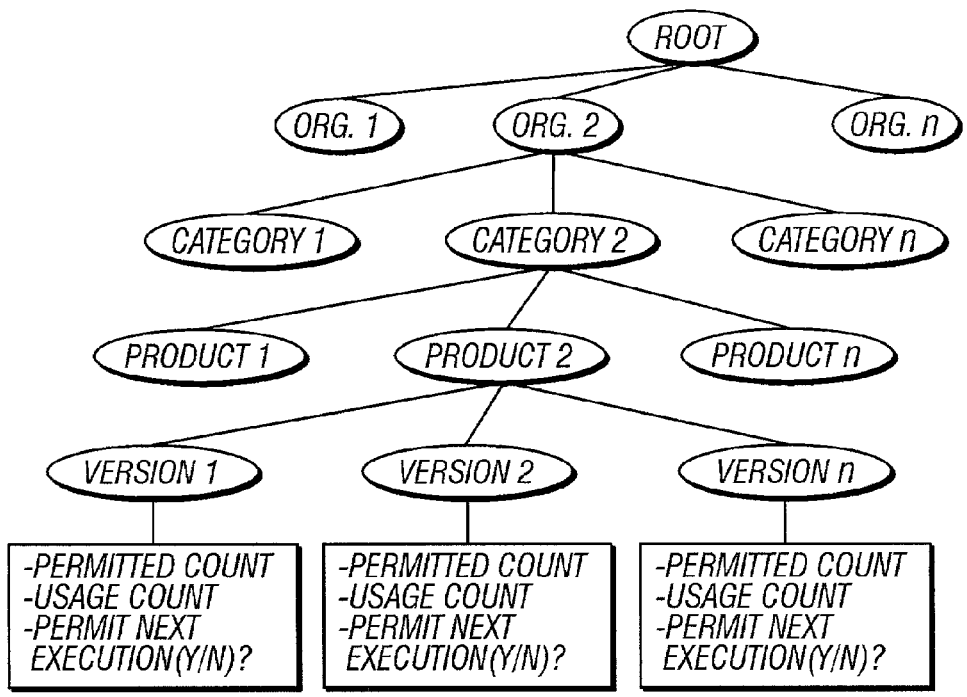
FIG. 7 is schematic block diagram of an exemplary embodiment of data structure for use in the system as seen in FIG. 3.

FIG. 7 is a schematic block flow diagram of an exemplary embodiment of a namespace tree for use in the system as seen in FIG. 1. In order to organize various software products produced by various vendors and serve licenses using various licensing models, the namespace tree provides a means of organization.

The namespace tree may be organized using data associated with vendors or organizations, categories of software, products, and versions of those products, and licensing modeled data associated with those products, among others. The namespace tree may be organized in the hierarchical fashion as denoted in FIG. 7. However, various other organizations may be envisaged.

With the namespace tree, an organization such as an international standards organization or a vendor of the license enforcement server may establish a universal license enforcement database structure. With this universal license enforcement database structure, one license enforcement server may serve licenses associated with software from various vendors, various products, and various versions.

Figure 8:
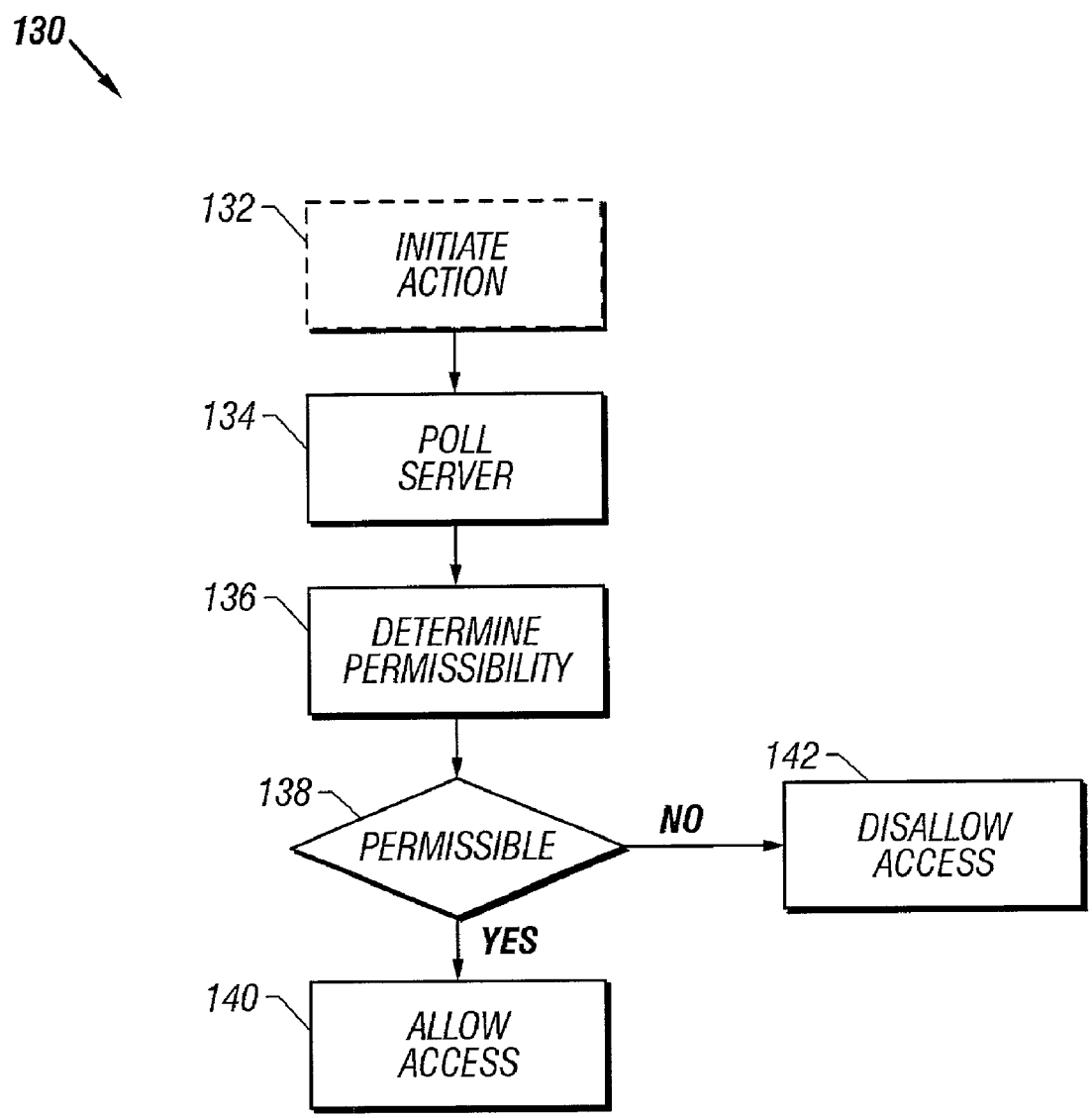
FIG. 8 is a block flow diagram of an exemplary method for use by the system as seen in FIG. 1.

FIG. 8 is a block flow diagram of an exemplary method for use by the system as seen in FIG. 1. The method 130 may begin with an initiated action 132. This action may be a user initiating the start of a software application or, for example, the user initiating an installation of a software program. However, this step may or may not be included in the method.

In a next step, as denoted in block 134, a client computational device may pole the license enforcement server requesting permission to perform a licensed activity. The licensed activity may, for example, be the installation of a software, the running of a software or the continued running of a software, among others.

In a further step as denoted in a block 136, the license enforcement server may determine permissibility. The license enforcement server may use various information to determine whether a licensed activity is permissible. For example, the license enforcement server may use the IP address of the client machine, the type of software, the version of software, the number of similar applications running on the network simultaneously, the date, the amount of time that application or similar applications have been running and the number of application launches, among others. Once the license enforcement server has determined permissibility, it may send a message to the client computational device denoting the permissibility.

As seen in block 138, if the activity is permissible, the client machine may allow access as seen in block 140. However, if permission is denied, the client machine may disallow access as seen in block 142.

Figure 9:
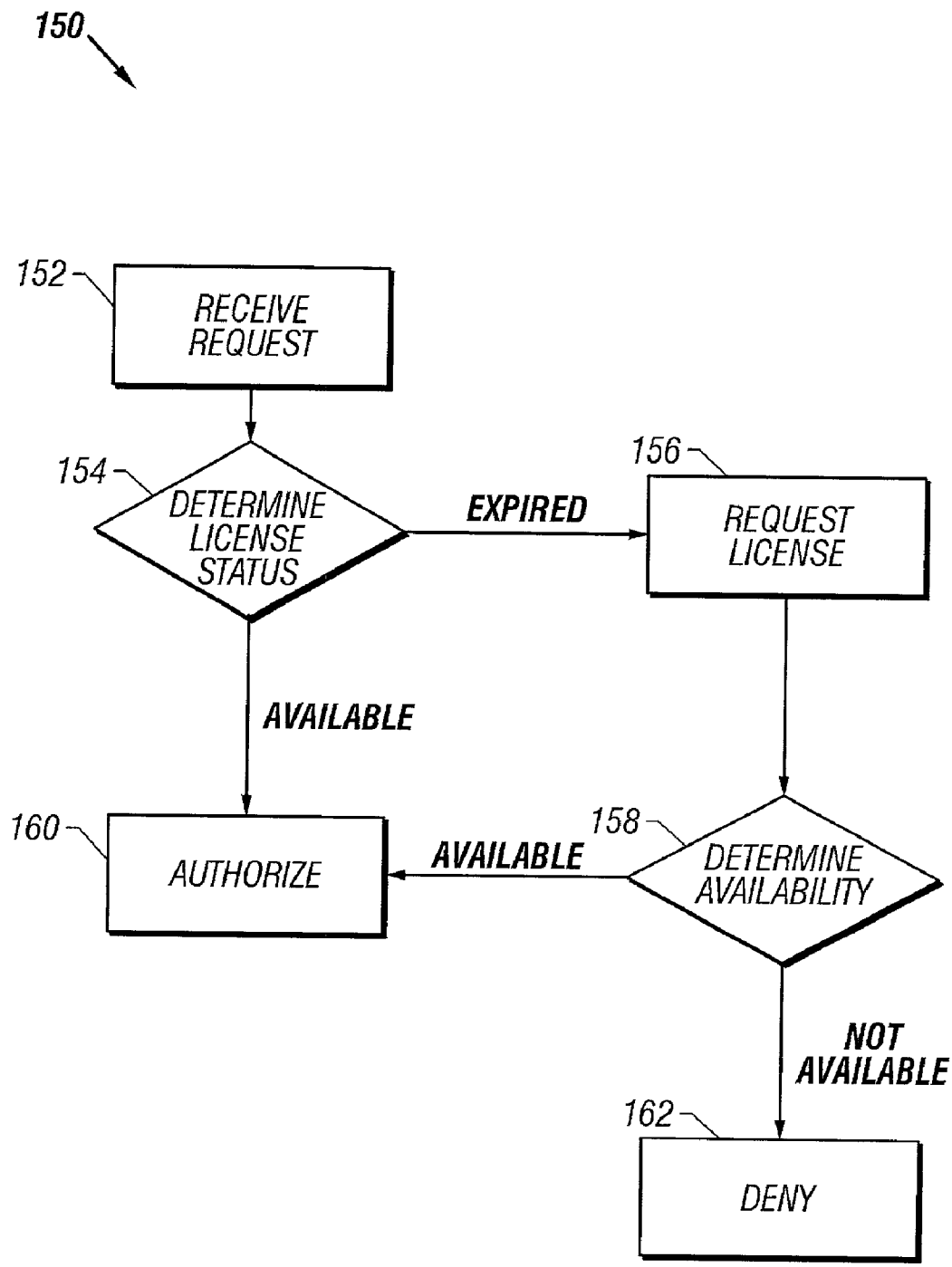
FIG. 9 is a block flow diagram of an exemplary method for use by the system as seen in FIG. 3.

The license enforcement server may deny permission in the event that a license has expired or the application count is exceeded, among other reasons. FIG. 9 is a block flow diagram of an exemplary method for use in the system as seen in FIG. 3. The method may be used to obtain a license, additional license, addendum to a license, or confirm a license, among others. Further, other method steps may be envisaged to perform these and other activities.

In a block 152, the license enforcement server may receive a request for permission to perform a licensed activity. The request may have been generated by, for example, a client machine. However, the request may be generated through other means. Further, this step may be replaced by a query from a license enforcement gateway. Alternately, the step as seen in block 152 may or may not be included in the method.

In another exemplary embodiment, the method may seek to determine the status of the license periodically. As such, the step as seen in the block 152, may not be included in the method.

Returning to FIG. 9, in response to receiving the request or other initiating steps, the licenses enforcement sever may determine the status of the license, as seen in a block 154. If the license is available, the license enforcement server may selectively authorize the licensed activity, as seen in a block 160. This authorization may, for example, include responding to the request for permission.

If, however, the license is not available or expired, the license enforcement server may request a new license, an addendum to an existing license, or an extension, among others, as seen in a block 156. For example, a time limit may have been exceeded by previous uses of a licensed application. The license enforcement server may be configured to acquire an extension of the time. Alternately, an expiration date may have passed and the license enforcement server may acquire a new expiration date. Other embodiments may include adding more to the permitted application count, increasing the number of permitted launches, and increasing the number of permitted installations, among others.

An additional step may or may not be incorporated requiring user interaction to permit the request. Further various algorithms may be used in determining whether to make a request for a change in licenses. Moreover, various means may be established for payment for the contract. In addition, the license enforcement server may have means for establishing a temporary license.

To request additional licenses or change existing licenses, the license enforcement server may communicate with a license enforcement gateway or other system through a global network. However, other means may be envisaged for requesting a license. The license enforcement server may, through the communication or other means, determine the availability of a license, as seen in a block 158. This determination may be made by receiving updated, new, or additional information and/or data regarding the license. The license enforcement server may then adjust the availability of the license.

If permission is established, the license enforcement server may authorize the licensed activity as seen in the block 160. However, if an addendum, change, new, or supplemental license is not established, the license enforcement server may deny permission to perform the licensed activity as seen in a block 162.

In this manner, the license enforcement server may automatically update licenses. Further through the communication with the license enforcement gateway, the license enforcement server may inform the licensor of attempts to perform licensed activities without a license. Moreover, the method may enable a company to more optimally license software based on smaller increments of use. As such, this approach may be more economical for both the licensee and licensor. The method and system may prevent both accidental misuses and piracy.

Although the present invention has been described in detail, it should be understood that various changes, substitutions and alterations can be made hereto without departing from the spirit and scope of the invention as defined by the appended claims.

What is claimed is:

1. A system for authorizing a licensed activity associated with a software program, the system comprising:
    a license enforcement server associated with an operating system of a network-critical machine, the network-critical machine being connected to an interconnected network;
    at least one database associated with the license enforcement server;
    at least one computation device connected to the interconnected network;
    at least one instruction set for communicating with the license enforcement server and receiving a message from the license enforcement server indicating a state of authorization associated with the licensed activity, the at least one instruction set being associated with the at least one computational device;
    a namespace tree, the namespace tree uniquely identifying the licensed activity; and
    at least one license enforcement gateway communicatively coupled to the license enforcement server;
    wherein the license enforcement server connects to the license enforcement gateway to synchronize and validate at least one of the database and the namespace tree;
    wherein an alarm is created if the state of authorization includes an unauthorized state;
    wherein;
        the license enforcement server periodically confirms the validity of at least one license according to at least one of a date, a number of launches, and a number of logged hours; and
        the license enforcement server authorizes licenses without communicating with the license enforcement gateway between the periodic confirmations;
    wherein the licensed activity is prevented if the state of authorization includes the unauthorized state.

2. The system of claim 1 wherein the network-critical machine is a primary domain control server.

3. The system of claim 1 wherein the network-critical machine is an address server.

4. The system of claim 1 the system further comprising:
    a second network-critical machine associated with a second license enforcement server; and
    a second database associated with the second license enforcement server.

5. The system of claim 1 wherein the license enforcement server is integrated with the operating system.

6. The system of claim 1 wherein the namespace tree is organized utilizing data associated with at least one of vendors, categories of software, products, versions of the products, and licensing modeled data associated with the products.

7. The system of claim 1 wherein the license enforcement server serves licenses associated with software from a plurality of vendors.

8. The system of claim 1 wherein the license enforcement server communicates with the license enforcement gateway information associated with at least one of a licenses, data regarding use of a particular license, request for receiving new licenses, requests for receiving updates to licenses, alarms associated with piracy, and alarms associated with a disabling of a license.

9. A license enforcement server system comprising:
    a license enforcement server associated with an operating system of a network-critical machine, the license enforcement sewer including;
    an instruction set for interfacing with at least one database associated with at least one software license;
    an instruction set for receiving a communication through an interconnected network front at least one computation device connected to the interconnected network, the communication being associated with a request for permission to perform a licensed activity associated with a licensed software;
    a namespace tree, the namespace tree uniquely identifying the licensed activity;
    an instruction set for determining a state of permission to perform the licensed activity associated with a licensed software; and
    an instruction set for sending a message through the interconnected network to the computation device, the message being associated with the state of permission to perform the licensed activity;
    wherein at least one license enforcement gateway is communicatively coupled to the license enforcement server;
    wherein the license enforcement server connects to the license enforcement gateway to synchronize and validate a least one if the database and the namespace tree;
    wherein an alarm is created if the state of permission includes an unauthorized state;
    wherein;
        the license enforcement server periodically confirms the validity of at least one license according to at least one of a date, a number of launches, and a number of logged hours; and
        the license enforcement server authorizes licenses without communicating with the license enforcement gateway between the periodic confirmations;
    wherein the licensed activity is prevented if the state of permission includes the unauthorized state.

10. The license enforcement server system of claim 9 wherein the license enforcement server is integrated with the operating system of the network-critical machine.

11. The license enforcement server system of claim 9 wherein the network-critical machine is a primary domain control server.

12. The license enforcement server system of claim 9 wherein the network-critical machine is an address server.

13. The license enforcement server system of claim 9 wherein the namespace tree is associated with the at last one software license.

14. A computational device connected to an interconnected network, the computational device including a processor for executing instructions stored on a computer-readable storage medium comprising:
    an instruction set for communicating with a license enforcement server associated with an operating system of a network-critical machine, the communication comprising a request for a permission to perform a licensed activity and a return message associated with a status of the permission to perform the licensed activity; and
    an instruction set for performing the licensed activity, the computational device selectively performing the licensed activity using the instruction set for performing the licensed activity;

wherein at least one license enforcement gateway is communicatively coupled to the license enforcement server;
wherein a namespace tree uniquely identifies the licensed activity;
wherein the license enforcement server connects to the license enforcement gateway to synchronize and validate the namespace tree;
wherein an alarm is created if a state of authorization includes an unauthorized state;
wherein;
   the license enforcement server periodically confirms the validity of at least one license according to at least one of a date, a number of launches, and a number of logged hours; and
   the license enforcement server authorizes licenses without communicating with the license enforcement gateway between the periodic confirmations;
   wherein the licensed activity is prevented if the state of authorization includes the unauthorized state.

15. The computational device of claim 14 wherein the network-critical machine is a primary domain control server.

16. The computational device of claim 14 wherein the network-critical machine is an address server.

17. A method for authorizing a licensed activity associated with a computational device connected to an interconnected network, the method comprising:
poling a license enforcement server associated with the operating system of a network-critical machine;
selectively determining the permissibility of the licensed activity associated with the computational device connected to the interconnected network;
sending, a message associated with the permissibility of the licensed activity to the computational device; and
selectively performing the licensed activity;
wherein at least one license, enforcement gateway is communicatively coupled to the license enforcement server;
wherein a namespace tree uniquely identifies the licensed activity;
wherein the license enforcement server connects to the license enforcement gateway to synchronize and validate the namespace tree;
wherein an alarm is created if a state of authorization includes an unauthorized state;
wherein;
   the license enforcement server periodically confirms the validity of at least one license according to at least one of a date, a number of launches, and a number of logged hours; and
   the license enforcement server periodically authorizes licenses without communicating with the license enforcement gateway between the periodic confirmations;
wherein the licensed activity is prevented if the state of authorization includes the unauthorized state.

18. The method of claim 17 wherein the network-critical machine is a primary domain control server.

19. The method of claim 17, wherein the network-critical machine is an address server.

20. An operating system with an integrated license enforcement server, the operating system comprising:
an instruction set for interfacing with at least one database associated with software licenses;
an instruction set for receiving a communication through an interconnected network from at least one computation device connected to the interconnected network, the communication being associated with a request for permission to perform a licensed activity associated with a licensed software;
an instruction set for determining a state of permission to perform the licensed activity associated with a licensed software; and
an instruction set for sending a message through the interconnected network to the computation device, the message being associated with the state of permission to perform the licensed activity;
wherein at least one license enforcement gateway is communicatively coupled to the license enforcement server;
wherein a namespace tree uniquely identifies the licensed activity;
wherein the license enforcement server connects to the license enforcement gateway to synchronize and validate a least one of the database and the namespace tree;
wherein an alarm is created if the state of permission includes an unauthorized state;
wherein;
   the license enforcement server periodically confirms the validity of at least one license according to at least one of a date, a number of launches, and a number of logged hours; and
   the license enforcement server authorizes licenses without communicating with the license enforcement gateway between the periodic confirmations;
wherein the license activity is prevented if the state of permission includes the unauthorized state.

21. The operating system of claim 20 wherein the operating system is associated with a network-critical machine.

22. The operating system of claim 20, the operating system further comprising:
a link conjoining the operability of the operating system to the operability of the license enforcement server.

23. A method for acquiring a license to perform a licensed activity with a license enforcement server, the license enforcement server being associated with a network-critical machine, the method comprising:
selectively requesting a license from a remote system, the remote system communicatively coupled to the license enforcement server associated with the network-critical machine, the license establishing at least one condition for performing the licensed activity;
determining the availability of the license with the license enforcement server associated with the network-critical machine; and
selectively authorizing the licensed activity based on the at least one condition for performing the licensed activity established by the license;
wherein a least one license enforcement gateway is communicatively coupled to the license enforcement server;
wherein a namespace tree uniquely identifies the licensed activity;
wherein the license enforcement server connects to the license enforcement gateway to synchronize and validate the namespace tree;
wherein an alarm is created if a state of authorization includes an unauthorized state;
wherein;
   the license enforcement server periodically confirms the validity of at least one license according to at least one of a date, a number of launches, and a number of logged hours; and the license enforcement server authorizes licenses without communicating with the license enforcement gateway between the periodic confirmations; wherein the licensed activity is prevented if the state of authorization includes the unauthorized state.

24. The method of claim 23 wherein the network-critical machine is a primary domain control server.

25. The method of claim 23 wherein the remote system is the license enforcement gateway communicatively coupled with the license enforcement server associated with the network-critical machine, the license enforcement gateway being communicatively coupled with the network-critical machine through a global network.

26. The method of claim 23, the method further comprising:

receiving a request for permission to perform the licensed activity from a client device, the request being received by the license enforcement server; and determining the status of the license to perform the licensed activity.

27. The method of claim 23 wherein the license enforcement server is integrated with an operating system associated with the network-critical machine.

* * * * *

UNITED STATES PATENT AND TRADEMARK OFFICE
CERTIFICATE OF CORRECTION

PATENT NO. : 7,140,042 B2
APPLICATION NO. : 10/047250
DATED : November 21, 2006
INVENTOR(S) : Ravi Verma It is certified that error appears in the above-identified patent and that said Letters Patent is hereby corrected as shown below:

Col. 13, line 32 replace "wherein;" with --wherein:--;
Col. 14, line 4 replace "sewer" with --server--;
Col. 14, line 4 replace "including;" with --including:--;
Col. 14, line 8 replace "front" with --from--;
Col. 14, line 27 replace "a" with --at--;
Col. 14, line 27 replace "if" with --of--;
Col. 14, line 30 replace "wherein;" with --wherein:--;
Col. 14, line 49 replace "last" with --least--;
Col. 15, line 11 replace "wherein;" with --wherein:--;
Col. 15, line 33 replace "sending," with --sending--;
Col. 15, line 36 replace "license," with --license--;
Col. 15, line 46 replace "wherein;" with --wherein:--;
Col. 16, line 18 replace "a" with --at--;
Col. 16, line 21 replace "wherein;" with --wherein:--;
Col. 16, line 29 replace "license" with --licensed--;
Col. 16, line 52 replace "a" with --at--;
Col. 16, line 63 replace "wherein;" with --wherein:--.

Signed and Sealed this

Ninth Day of February, 2010

David J. Kappos
*Director of the United States Patent and Trademark Office*